United States Patent
Liu et al.

(10) Patent No.: US 11,888,148 B2
(45) Date of Patent: Jan. 30, 2024

(54) POSITIVE ELECTRODE PLATE, AND ELECTROCHEMICAL APPARATUS AND ELECTRONIC APPARATUS INCLUDING THE POSITIVE ELECTRODE PLATE

(71) Applicant: Ningde Amperex Technology Limited, Fujian (CN)

(72) Inventors: Shengqi Liu, Fujian (CN); Dongdong Han, Fujian (CN); Qingwen Zhang, Fujian (CN); Rui Zhu, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 247 days.

(21) Appl. No.: 17/212,303

(22) Filed: Mar. 25, 2021

(65) Prior Publication Data
US 2021/0336247 A1 Oct. 28, 2021

(30) Foreign Application Priority Data
Mar. 27, 2020 (CN) .......................... 202010228361.7

(51) Int. Cl.
| | |
|---|---|
| H01M 4/134 | (2010.01) |
| H01M 4/131 | (2010.01) |
| H01M 4/36 | (2006.01) |
| H01M 4/62 | (2006.01) |
| H01M 4/66 | (2006.01) |
| H01M 10/0525 | (2010.01) |
| H01M 4/505 | (2010.01) |
| H01M 4/52 | (2010.01) |
| H01M 4/485 | (2010.01) |
| H01M 4/02 | (2006.01) |

(52) U.S. Cl.
CPC ........... *H01M 4/134* (2013.01); *H01M 4/131* (2013.01); *H01M 4/366* (2013.01); *H01M 4/485* (2013.01); *H01M 4/505* (2013.01); *H01M 4/52* (2013.01); *H01M 4/623* (2013.01); *H01M 4/663* (2013.01); *H01M 10/0525* (2013.01); *H01M 2004/028* (2013.01)

(58) Field of Classification Search
CPC ........ H01M 4/131; H01M 4/134; H01M 4/46; H01M 4/36; H01M 4/66
See application file for complete search history.

(56) References Cited

U.S. PATENT DOCUMENTS

| | | | | |
|---|---|---|---|---|
| 2013/0224562 A1* | 8/2013 | Momo | .............. | H01M 10/0436 429/149 |
| 2014/0093761 A1* | 4/2014 | Sakanaka | .......... | H01M 50/3425 429/82 |
| 2016/0285103 A1* | 9/2016 | Shitaba | .................. | H01M 4/366 |
| 2018/0294474 A1 | 10/2018 | Zhamu et al. | | |

FOREIGN PATENT DOCUMENTS

| | | |
|---|---|---|
| CN | 108511753 | 9/2018 |
| CN | 108808006 | 11/2018 |
| CN | 108808068 | 11/2018 |
| CN | 109841831 | 6/2019 |
| CN | 110224169 | 9/2019 |
| JP | 2019169376 | 10/2019 |

OTHER PUBLICATIONS

Liu Shengqi; Extended European Search Report for Application No. 21164272.3, filed Mar. 23, 2021; dated Aug. 25, 2021; 8 pages.
Liu Shengqi; First Office Action for Chinese Application No. 202010228361.7, filed Mar. 27, 2020; dated Sep. 23, 2021; 17 pages.
Liu Shengqi; Second Office Action for Chinese Application No. 202010228361.7, filed Mar. 27, 2020; dated Dec. 7, 2021; 10 pages.

* cited by examiner

*Primary Examiner* — Kenneth J Douyette
(74) *Attorney, Agent, or Firm* — XSENSUS LLP

(57) ABSTRACT

A positive electrode plate includes a positive electrode current collector and two positive electrode active material layers on both surfaces of the positive electrode current collector. The positive electrode active material layer includes a positive electrode active material and graphene. And $7.74 \leq Dv50^{1/2} + 0.05 \, THK \leq 10.2$, Dv50 is a particle size of the positive electrode active material and THK is a thickness of the positive electrode plate. And $0.078 \leq w*CW + 0.01n \leq 1.9$, n is a quantity of layers of the graphene, w is a mass percentage of the graphene in the positive electrode active layer, and CW is a one-side coating weight of the positive electrode active material layer.

19 Claims, No Drawings

POSITIVE ELECTRODE PLATE, AND ELECTROCHEMICAL APPARATUS AND ELECTRONIC APPARATUS INCLUDING THE POSITIVE ELECTRODE PLATE

CROSS REFERENCE TO THE RELATED APPLICATIONS

The present application claims the benefit of priority from the Chinese Patent Application No. CN202010228361.7, filed on 27 Mar. 2020, the disclosure of which is hereby incorporated by reference in its entirety.

TECHNICAL FIELD

The present application relates to the field of energy storage, and in particular, to a positive electrode plate, and an electrochemical apparatus and an electronic apparatus including the positive electrode plate.

BACKGROUND

With the development of the lithium-ion battery industry, the market imposes increasingly high requirements on the energy density of the lithium-ion batteries. Energy density of a lithium-ion battery can be improved by increasing compacted density of the positive electrode. However, increasing the compacted density of a positive electrode plate easily causes the problem of fractures of the electrode plate. Resolving the fracture problem of a positive electrode plate with high compacted density helps improve the energy density of lithium-ion batteries.

SUMMARY

The inventor of this application conducted in-depth research on the fracture problem of a positive electrode plate with high compacted density, and found that when graphene was introduced into a positive electrode active material layer of the positive electrode plate, the fracture problem of a positive electrode plate with high compacted density could be mitigated by properly adjusting thickness of the positive electrode active material layer, a particle size of the positive electrode active material, and a coating weight of the positive electrode active material layer and controlling a quantity of layers and mass percentage of the graphene are properly controlled; and the prepared lithium-ion battery had better cycle performance.

A first aspect of this application provides a positive electrode plate, where the positive electrode plate includes a positive electrode current collector and a positive electrode active material layer, the positive electrode active material layer includes a positive electrode active material and graphene, and $7.74 \leq Dv50^{1/2} + 0.05\ THK \leq 10.2$, where Dv50 is a particle size of the positive electrode active material and THK is a thickness of the positive electrode plate, Dv50 is measured in μm; THK is measured in μm; and $0.078 \leq w*CW + 0.01n \leq 1.9$, where n is a quantity of layers of the graphene, w is a mass percentage of the graphene in the positive electrode active material layer, and CW is a one-side coating weight of the positive electrode active material layer; and CW is measured in mg/1540.25 mm².

In some implementations of this application, a compacted density of the positive electrode plate after cold pressing is 4.2 g/mm³ to 4.35 g/mm³.

In some implementations of this application, the positive electrode active material includes at least one selected from the group consisting of lithium cobalt oxide, lithium nickel cobalt manganate, lithium nickel cobalt aluminate, lithium manganate oxide, lithium manganese iron phosphate, lithium vanadium phosphate, lithium vanadyl phosphate, lithium iron phosphate, lithium titanate, and lithium-manganese-containing-based material.

In some implementations of this application, Dv50 is 13 μm to 18 μm, preferably 14 μm to 16 μm.

In some implementations of this application, the thickness THK of the positive electrode plate is 80 μm to 115 μm.

In some implementations of this application, the positive electrode plate has at least one of the following characteristics:
w is 0.01% to 0.5%, and n is 6 to 20; and
CW is 180 mg/1540.25 mm² to 350 mg/1540.25 mm².

In some other implementations of this application, w is 0.05% to 0.3%;
n is 8 to 14 layers; and
CW is 220 mg/1540.25 mm² to 350 mg/1540.25 mm².

In some implementations of this application, the positive electrode active material layer further includes a conductive agent, and the conductive agent includes at least one selected from the group consisting of carbon black, Ketjen black, acetylene black, and carbon nanotube.

In some implementations of this application, the positive electrode active material layer further includes a binder, and the binder includes at least one selected from the group consisting of polyvinylidene fluoride, vinylidene fluoride-hexafluoropropylene copolymer, vinylidene fluoride-tetrafluoroethylene copolymer, and polytetrafluoroethylene.

A second aspect of this application provides an electrochemical apparatus, including the positive electrode plate according to any one of the foregoing implementations.

A third aspect of this application provides an electronic apparatus, including the electrochemical apparatus according to any one of the foregoing implementations.

In this application, the relationship between the particle size distribution of the positive electrode active material and the thickness of the positive electrode plate is well matched, and an appropriate amount of the graphene is also introduced, thereby implementing the electrochemical apparatus and the electronic apparatus that have high compacted density, high energy density, and excellent electrical performance.

Certainly, when any product or method of this application is implemented, all advantages described above are not necessarily demonstrated simultaneously.

The terms used in this application are commonly used by those skilled in the art. If the terms are inconsistent with the commonly used terms, the terms in this application shall prevail.

In this specification, the following term has the following meaning:

Particle size Dv50 of the positive electrode active material: In volume-based particle size distribution of the positive electrode active material, a volume percentage of positive electrode active materials with a particle size less than Dv50 is 50% of the total particles. The particle size is measured in μm.

DESCRIPTION OF EMBODIMENTS

The following clearly and fully describes the technical solutions in the embodiments of this application in the embodiments of this application. Apparently, the described embodiments are only a part rather than all of the embodiments of this application. All other embodiments obtained by those skilled in the art based on the embodiments of this application without creative efforts shall fall within the protection scope of this application.

A first aspect of this application provides a positive electrode plate, where the positive electrode plate includes a positive electrode current collector and a positive electrode active material layer, the positive electrode active material layer includes a positive electrode active material and graphene, and $7.74 \leq Dv50^{1/2}+0.05$ THK$\leq 10.2$, where Dv50 is a particle size of the positive electrode active material and THK is a thickness of the positive electrode plate, Dv50 is measured in µm, and THK is measured in µm; and $0.078 \leq w^*CW+0.01n \leq 1.9$, where n is a quantity of layers of the graphene, w is a mass percentage of the graphene in the positive electrode active material layer, and CW is a one-side coating weight of the positive electrode active material layer; CW is measured in mg/1540.25 mm$^2$.

The thickness THK of the positive electrode plate is an overall thickness of the double-side-coated positive electrode plate after cold pressing, including the positive electrode current collector and the positive electrode active material layer, and is measured in µm.

In some implementations of this application, a compacted density of the positive electrode plate after cold pressing is 4.2 g/mm$^3$ to 4.35 g/mm$^3$. Higher compacted density after cold pressing indicates more active material contained in the positive electrode active material layer, so as to correspondingly increase the energy density of the lithium-ion battery.

The inventor found that in the positive electrode plate of this application, a lithium-ion battery with high compacted density after cold pressing and excellent battery performance could be obtained by means of properly controlling the particle size of the positive electrode active material and introducing the graphene. In one implementation solution of this application, when the relationship between the particle size Dv50 of the positive electrode active material and the thickness THK of the positive electrode plate satisfies $7.74 \leq Dv50^{1/2}+0.05$ THK$\leq 10.2$, and the relationship between n, which is the quantity of layers of the graphene, w, which is the mass percentage of the graphene in the positive electrode active material layer, and CW, which is the one-side coating weight of the positive electrode active material layer, satisfies $0.078 \leq w^*CW+0.01n \leq 1.9$, a lithium-ion battery with high compacted density after cold pressing and excellent battery cycle performance is obtained. CW is measured in mg/1540.25 mm$^2$.

In this application, selection of the positive electrode current collector is not particularly limited, and may be prepared by using any method known to those skilled in the art or be purchased. For example, an aluminum foil may be selected.

Through in-depth study, the inventor found that when the particle size Dv50 of the positive electrode active material was excessively large or the thickness of the positive electrode active material layer is relatively large, resulting in an upper limit of $7.74 \leq Dv50^{1/2}+0.05$ THK exceeding 10.2, the compacted density of the positive electrode plate was excessively small and the volume energy density of the battery was relatively low.

Not based on any theory, the inventor considered that the energy density of the positive electrode plate was reduced due to the excessively large particle size Dv50 of the positive electrode active material, poor particle accumulation, a relatively large quantity of pores, and a relatively small amount of active materials per unit volume; the positive electrode active material layer with a large thickness results in a longer ion transmission path, a larger ion diffusion resistance, and poorer cycle performance of a battery cell; further, excessively small compacted density of the electrode plate caused poor contact between the positive electrode particles, and a conductive network was prone to damages during expansion of particles at the time of charging/discharging, resulting in deteriorated cycle performance, especially the cycle performance of the battery in a high-temperature environment.

In some implementations, the particle size Dv50 of the positive electrode active material is 13 µm to 18 µm, preferably 14 µm to 16 µm.

In this application, for the particle size Dv50 of the positive electrode active material, the particle size distribution may be measured by using a laser diffraction particle size distribution tester (Mastersizer 3000) based on a particle size distribution laser diffraction method (specifically referring to GB/T19077-2016), and a median value Dv50 is used to represent volume distribution of the average particle size.

In some implementations, the thickness THK of the positive electrode plate is 80 µm to 110 µm.

The inventor found that higher compacted density after cold pressing and better cycle performance could be ensured for the positive electrode plate by means of using a positive electrode active material having a specific particle size, adjusting the thickness THK of the positive electrode plate, and controlling a specific quantity of layers of the graphene and the amount of the graphene added.

In this application, the positive electrode active material of the lithium-ion battery is not particularly limited. For example, the positive electrode active material may include at least one selected from the group consisting of lithium cobalt oxide, lithium nickel cobalt manganate, lithium nickel cobalt aluminate, lithium manganate oxide, lithium manganese iron phosphate, lithium vanadium phosphate, lithium vanadyl phosphate, lithium iron phosphate, lithium titanate, and lithium-manganese-containing-based material.

These positive electrode materials may be used alone or in combination of two or more types.

For example, in the positive electrode active material described above, the chemical formula of lithium cobalt oxide may be $Li_xCo_aM1_bO_{2-c}$, where M1 is selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si), and a combination thereof; and values of x, a, b, and c are in the following ranges: $0.8 \leq x \leq 1.2$, $0.8 \leq a \leq 1$, $0 \leq b \leq 0.2$, and $-0.1 \leq c \leq 0.2$.

The coating weight of the positive electrode active material also affects the performance of the positive electrode plate. A larger coating weight of the positive electrode per unit area indicates higher energy density of the battery. However, an excessively large coating weight leads to a larger ion diffusion impedance. During charging/discharging of the battery, the ion concentration gradient gradually increases and the polarization increases. Therefore, it is necessary to control the coating weight of the electrode to achieve the best charging/discharging performance of the battery cell.

Through in-depth research, the inventor found that when the graphene with a layered structure was introduced into the active material coating layer of the positive electrode plate, a lubrication role could be played between the particles during cold pressing, so as to improve movement of the particles, reduce the force applied on the positive electrode current collector, and reduce intercalating of the particle material in the positive electrode current collector, thereby mitigating brittleness of the electrode plate. In this way, the electrode plate maintains relatively good flexibility under high compaction, and the electrode plate is not broken during folding. However, the graphene is a sheet material; an excessively large addition amount may cause z-direction conduction of the ion path while an excessively small addition amount neither improves movement between the particles nor increases the compacted density.

In this application, comprehensively considering the one-side coating weight CW of the positive electrode active material layer of the positive electrode plate and the mass percentage w and the quantity of layers n of the graphene, it was found through in-depth research that when the relationship among the three meets $0.078 \leq w*CW+0.01n \leq 1.9$, the kinetic performance and the energy density of the battery are further improved, and the energy density of the battery is increased.

Not based on any theory, the inventor considered that when an excessively large graphene content, an excessively large one-side coating weight of the positive electrode active material layer, and an excessively large quantity of layers of the graphene resulted in an upper limit of $w*CW+0.01n$ being greater than 1.9, the electron ion transmission path of the positive electrode plate became longer, leading to poorer conductivity and poorer kinetic performance of the battery; in addition, the high compacted density of the positive electrode made the internal pore structure of the positive electrode plate relatively dense, not good for immersing in the electrolyte, and the liquid phase conduction resistance of the active ions inside the pores of the positive electrode plate became larger, not good for improvement of the overall kinetic performance and cycle performance of the battery.

A relatively small graphene content, a relatively small one-side coating weight of the positive electrode active material layer, and a relatively small quantity of layers of the graphene resulted in a lower limit of $w*CW+0.01n$ being less than 0.078, the lubricating effect of the graphene was reduced. During cold pressing of the electrode plate, the positive electrode active material particles increased damages to the current collector, and the electrode plate was prone to fractures, thereby decreasing the compacted density and failing to provide the expected energy density. However, an excessively large quantity of layers of the graphene easily deteriorates the conductivity performance and easily decreases the cycle performance. Therefore, it is necessary to select an appropriate quantity of layers for the graphene to increase the compacted density of the electrode plate, increase the energy density of the battery cell, and improve the cycle performance.

In some implementations, the positive electrode plate has at least one of the following characteristics:

The mass percentage w of the graphene in the positive electrode active material layer is 0.01% to 0.5%, preferably 0.05% to 0.3%. The layer quantity n of the graphene is 6 to 20, preferably 8 to 14. The one-side coating weight CW of the positive electrode active material layer is 180 mg/1540.25 mm$^2$ to 340 mg/1540.25 mm$^2$, preferably 220 mg/1540.25 mm$^2$ to 350 mg/1540.25 mm$^2$. Only one of the foregoing characteristics may be satisfied, or 2 to 4 of the foregoing characteristics may be satisfied simultaneously. This is not additionally limited particularly in this application.

The quantity n of layers of the graphene may be measured in a manner known in the art. For example, an atomic force microscope (AFM) may be used for measuring: fix one end of a micro cantilever that is extremely sensitive to weak force, and make the other end having a tiny needle tip to lightly come in contact with the surface of the graphene. Because there is a very weak repulsive force between atoms of the tip and atoms of the graphene surface, this force is controlled to be constant during scanning, and the micro cantilever with the needle tip undulates, relative to an equipotential plane of the force between atoms of the tip and the atoms of the graphene surface, in the direction perpendicular to the surface of the sample. In addition, the optical detection method or tunnel current detection method may be used to measure the position change of the micro cantilever relative to each scanning point, so as to obtain information of the thickness of the graphene sheet, and then calculate the quantity of layers of the graphene.

In some implementations, the positive electrode active material layer further includes a conductive agent, and the conductive agent includes at least one selected from the group consisting of carbon black, Ketjen black, acetylene black, and carbon nanotube. These conductive agents may be used alone or in combination of two or more types. The amount of the conductive agent content is not particularly limited, which may be a conventional value. For example, the conductive agent content may account for 0.5 wt % to 10 wt % of the positive electrode active material layer.

In some implementations, the positive electrode active material layer further includes a binder, and the binder includes at least one selected from the group consisting of polyvinylidene fluoride, a vinylidene fluoride-hexafluoropropylene copolymer, a vinylidene fluoride-tetrafluoroethylene copolymer, and polytetrafluoroethylene. These binders may be used alone or in combination of two or more types. The amount the binder content is not particularly limited, for example, the binder content may account for 0.5 wt % to 10 wt % of the positive electrode active material layer.

In some implementations, this application provides an electrochemical apparatus, including the positive electrode plate described in this application. The electrochemical apparatus described in this application includes but is not limited to a secondary battery or a super capacitor. A lithium-ion battery is used as an example for description.

The lithium-ion battery usually includes a positive electrode plate, a negative electrode plate, a separator, and an electrolyte. The negative electrode plate usually includes a negative electrode current collector and a negative electrode active material layer, and the negative electrode active material layer contains a negative electrode active material. The negative electrode active material may include, for example, at least one selected from the group consisting of graphite, silicon, silicon carbon, and the like.

In this application, the negative electrode plate is not particularly limited, and may be any negative electrode plate known in the art. The negative electrode current collector is neither particularly limited provided that the objective of this application can be achieved. For example, a copper foil, an aluminum foil, or the like, preferably a copper foil, may be used.

In this application, the electrolyte is not particularly limited, and the electrolyte may be in any one of a gel state, a solid state, and a liquid state. The electrolyte is not particularly limited provided that the objective of this application can be achieved. For example, the liquid electrolyte includes a lithium salt and a non-aqueous solvent.

The lithium salt is not limited, for example, the lithium salt may be selected from at least one selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, and $LiPO_2F_2$. The lithium salt may be used alone or in combination of two or more types. For example, the lithium salt may be $LiPF_6$.

The non-aqueous solvent is not limited, and for example, may be selected from at least one selected from the group consisting of a carbonate compound, a carboxylic acid ester compound, an ether compound, a nitrile compound, and other organic solvents.

For example, the carbonate compound may be selected from at least one selected from the group consisting of diethyl carbonate (DEC), dimethyl carbonate (DMC), dipropyl carbonate (DPC), methyl propyl carbonate (MPC), ethyl propyl carbonate (EPC), ethyl methyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, and trifluoromethylethylene carbonate. These non-aqueous solvents may be used alone or in combination of two or more types.

The separator is not particularly limited. For example, the separator includes a polymer or an inorganic substance formed of a material that is stable to the electrolyte of this application.

For example, the separator may include a substrate layer and a surface treatment layer. The substrate layer may be a non-woven fabric, film, or composite film with a porous structure, and the material of the substrate layer may be selected from at least one selected from the group consisting of polyethylene, polypropylene, polyethylene terephthalate, and polyimide. Optionally, polypropylene porous film, polyethylene porous film, polypropylene non-woven fabric, polyethylene non-woven fabric, or polypropylene-polyethylene-polypropylene porous composite film may be used. Optionally, a surface treatment layer is provided on at least one surface of the substrate layer, and the surface treatment layer may be a polymer layer or an inorganic substance layer, or a layer formed by a polymer and an inorganic substance.

For example, the inorganic substance layer includes inorganic particles and the binder. The inorganic particles are not particularly limited, and for example, may be selected from at least one selected from the group consisting of aluminum oxide, silicon oxide, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is not particularly limited, and for example, may be selected from a combination of any one of more of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene. The polymer layer contains a polymer, and the material of the polymer includes at least one selected from the group consisting of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

This application further provides an electronic apparatus, including the electrochemical apparatus in this application.

The electronic apparatus described in this application includes common electronic apparatuses in the art, such as a notebook computer, a mobile phone, an electric motorcycle, an electric car, and an electric toy.

Those skilled in the art can understand that the foregoing description of this application is merely an example and is not intended to limit this application.

In this application, the graphene is introduced into the active material coating layer of the positive electrode plate; the thickness of the positive electrode active material layer, the particle size of the positive electrode active material, and the coating weight of the positive electrode active material layer are well matched; and the quantity of layers and mass percentage of the graphene are properly controlled, thereby implementing an electrochemical apparatus having high compacted density, high energy density, and excellent cycle performance.

Test Method

Thickness Test for the Electrode Plate

The electrode plate was punched into small discs of 1540.25 $mm^2$, the thickness was uniformly measured at five different points using a micrometer or a ten-thousandth micrometer, and then an average value was calculated for the five points to obtain the thickness of the electrode plate.

Compacted Density Test for the Positive Electrode Plate after Cold Pressing

A positive electrode slurry was uniformly applied on the surface of the positive electrode current collector. After steps of drying in an oven at 110° C. to 120° C., and pressing under 80 t to 120 t force at a room temperature, the positive electrode plate after cold pressing was obtained.

The compacted density of the positive electrode plate after cold pressing is obtained through calculation: Compacted density of the positive electrode plate=CW(mg/1540.25 $mm^2$)/1540.25/Thickness of the positive electrode plate (mm).

Cycle Performance Test

Lithium-ion batteries prepared in Examples and Comparative Examples were charged to 4.45V at a 0.7C rate and discharged to 3.0V at a 1C rate at 25° C. and 45° C., respectively, to conduct full-charge and full-discharge cycle tests until the capacity of the lithium-ion battery was less than 80% of the initial capacity, and then the quantity of cycles was recorded.

This application is further described with reference to Examples. It should be understood that these Examples are merely intended to illustrate this application but not to limit the scope of the application.

EXAMPLE 1

Preparation of the Positive Electrode Plate

Conductive carbon black and carbon nanotube (in a mass ratio of 1:2) that serve as the conductive agent were mixed with the binder PVDF solution (7%) in a proportion of 1:1, and then NMP was added, to prepare conductive glue. After mixing was completed, a positive electrode active material lithium cobalt oxide (Dv50 is 15.6 μm) was added and stirred for some time, and then a graphene (with the quantity n of layers being 10) NMP slurry having 75% solid content was added. After stirring was performed continuously using a vacuum stirrer until the system was uniform, a positive electrode slurry having 75% solid content was obtained. A component mass ratio of the lithium cobalt oxide (LCO), the conductive agent, and the binder was 97.8:0.9:1.2; and a mass percentage w of the graphene in the positive electrode active material layer was 0.1%. The positive electrode slurry was uniformly applied onto both surfaces of the positive electrode current collector aluminum foil with a thickness of 9 μm based on the one-side coating weight CW of 303 mg/1540.25 mm$^2$. After steps of drying at 110° C. and pressing under 100 t force at the room temperature, and cutting, a positive electrode plate with a thickness THK of 100 μm was obtained.

In this example, $Dv50^{1/2}+0.05$ THK was 8.95, and w*CW+0.01n was 0.40.

Preparation of the Negative Electrode Plate

A negative electrode active material graphite, a thickener CMC, and a binder SBR were mixed based on a mass ratio of 97:1.2:1.3, were added with solvent deionized water, and then were stirred using a vacuum stirrer until the system was uniform, so as to obtain a negative electrode slurry having 50% solid content. The resulting negative electrode slurry was uniformly applied onto both surfaces of the negative electrode current collector copper foil with a thickness of 5 μm. After steps of drying at 90° C. and pressing under 100 t force at the room temperature, and cutting, a negative electrode plate with a thickness of 127 μm was obtained.

Preparation of the Electrolyte

The ethylene carbonate (EC), ethyl methyl carbonate (EMC), and diethyl carbonate (DEC) were mixed based on a volume ratio of 1:1:1 to obtain an organic solvent, and then fully dried lithium salt $LiPF_6$ was dissolved in the mixed organic solvent, so as to obtain an electrolyte with a concentration of 1 mol/L.

Preparation of the Separator

A polyethylene film with a thickness of 15 μm was selected as the separator.

Preparation of the Lithium-Ion Battery

The positive electrode plate, the separator, and the negative electrode plate were stacked in order, so that the separator was placed between the positive and negative electrode plates and has an effect of separation. Then the stack was wound to obtain a bare cell. The bare cell was placed in the outer packaging case and dried. Then the electrolyte was injected into the dried bare cell. After steps including vacuum packaging, standing, chemical conversion, and shaping, a lithium-ion battery was obtained.

EXAMPLE 2

Example 2 is the same as Example 1 except that the binder was replaced by PVDF-HFP, the thickness THK of the positive electrode plate was 80 μm, and the one-side coating weight CW was 234 mg/1540.25 mm$^2$.

In this example, $Dv50^{1/2}+0.05$ THK was 7.95, and w*CW+0.01n was 0.33.

EXAMPLE 3

Example 3 is the same as Example 1 except that the binder was replaced by PVDF-PTFE, the thickness THK of the positive electrode plate was 85 μm, and the one-side coating weight CW was 251 mg/1540.25 mm$^2$.

In this example, $Dv50^{1/2}+0.05$ THK was 8.20, and w*CW+0.01n was 0.35.

EXAMPLE 4

Example 4 is the same as Example 1 except that the thickness THK of the positive electrode plate was 90 μm, and the one-side coating weight CW was 267 mg/1540.25 mm$^2$.

In this example, $Dv50^{1/2}+0.05$ THK was 8.45, and w*CW+0.01n was 0.37.

EXAMPLE 5

Example 5 is the same as Example 1 except that during preparation of the positive electrode plate, the conductive agent was replaced by carbon nanotube, the component mass ratio of the lithium cobalt oxide (LCO), the conductive agent, and the binder was 98:0.9:1, the thickness THK of the positive electrode plate was 110 μm, and the one-side coating weight CW was 329 mg/1540.25 mm$^2$.

In this example, $Dv50^{1/2}+0.05$ THK was 9.45, and w*CW+0.01n was 0.43.

EXAMPLE 6

Example 6 is the same as Example 1 except that during preparation of the positive electrode plate, the component mass ratio of the lithium cobalt oxide (LCO), the conductive agent, and the binder was 97.50:1.1:1.30, the thickness THK of the positive electrode plate was 105 μm, and the one-side coating weight CW was 313 mg/1540.25 mm$^2$.

In this example, $Dv50^{1/2}+0.05$ THK was 9.20, and w*CW+0.01n was 0.41.

EXAMPLE 7

Example 7 is the same as Example 1 except that during preparation of the positive electrode plate, the conductive agent was replaced by carbon nanotube, the component mass ratio of the lithium cobalt oxide (LCO), the conductive agent, and the binder was 97.40:1.3:1.10, Dv50 of the positive electrode active material was 15 μm, the mass percentage w of the graphene in the positive electrode active material layer was 0.2%, and the one-side coating weight CW was 300 mg/1540.25 mm$^2$.

In this example, $Dv50^{1/2}+0.05$ THK was 8.87, and w*CW+0.01n was 0.70.

EXAMPLE 8

Example 8 is the same as Example 7 except that during preparation of the positive electrode plate, the component mass ratio of the lithium cobalt oxide (LCO), the conductive agent, and the binder was 97.30:1.3:1.10, and the mass percentage w of the graphene in the positive electrode active material layer was 0.3%.

In this example, $Dv50^{1/2}+0.05$ THK was 8.87, and w*CW+0.01n was 0.70.

EXAMPLE 9

Example 9 is the same as Example 7 except that during preparation of the positive electrode plate, the component mass ratio of the lithium cobalt oxide (LCO), the conductive agent, and the binder was 97.20:1.3:1.10, and the mass percentage w of the graphene in the positive electrode active material layer was 0.4%.

In this example, $Dv50^{1/2}+0.05$ THK was 8.87, and $w*CW+0.01n$ was 1.00.

EXAMPLE 10

Example 10 is the same as Example 7 except that during preparation of the positive electrode plate, the component mass ratio of the lithium cobalt oxide (LCO), the conductive agent, and the binder was 97.10:1.3:1.10, and the mass percentage w of the graphene in the positive electrode active material layer was 0.5%.

In this example, $Dv50^{1/2}+0.05$ THK was 8.87, and $w*CW+0.01n$ was 1.60.

EXAMPLE 11

Example 11 is the same as Example 1 except that Dv50 of the positive electrode active material was 14.5 μm, the conductive agent was replaced by Ketjen black+carbon nanotube (in a mass ratio of 2:1) during preparation of the positive electrode plate, the component mass ratio of the lithium cobalt oxide (LCO), the conductive agent, and the binder was 97.50:1.3:1.10, the thickness THK of the positive electrode plate was 90 μm, the quantity n of layers of the graphene was 12, and the one-side coating weight CW was 267 mg/1540.25 mm$^2$.

In this example, $Dv50^{1/2}+0.05$ THK was 8.31, and $w*CW+0.01n$ was 0.39.

EXAMPLE 12

Example 12 is the same as Example 1 except that Dv50 of the positive electrode active material was 16.3 μm, the conductive agent was replaced by carbon black+Ketjen black+carbon nanotube (in a mass ratio of 1:1:3) during preparation of the positive electrode plate, the component mass ratio of the lithium cobalt oxide (LCO), the conductive agent, and the binder was 97.30:1.3:1.10, the thickness THK of the positive electrode plate was 85 μm, the mass percentage w of the graphene in the positive electrode active material layer was 0.3%, the quantity n of layers of the graphene was 12, and the one-side coating weight CW was 251 mg/1540.25 mm$^2$.

In this example, $Dv50^{1/2}+0.05$ THK was 8.29, and $w*CW+0.01n$ was 0.87.

EXAMPLE 13

Example 13 is the same as Example 1 except that Dv50 of the positive electrode active material was 16.2 μm, the conductive agent was replaced by carbon black+Ketjen black+carbon nanotube (in a mass ratio of 1:1:2) during preparation of the positive electrode plate, the component mass ratio of the lithium cobalt oxide (LCO), the conductive agent, and the binder was 97.40:1.3:1.10, the thickness THK of the positive electrode plate was 88 μm, the mass percentage w of the graphene in the positive electrode active material layer was 0.2%, the quantity n of layers of the graphene was 12, and the one-side coating weight CW was 260 mg/1540.25 mm$^2$.

In this example, $Dv50^{1/2}+0.05$ THK was 8.42, and $w*CW+0.01n$ was 0.64.

EXAMPLE 14

Example 14 is the same as Example 1 except that Dv50 of the positive electrode active material was 15.8 μm, the conductive agent was replaced by acetylene black+carbon nanotube (in a mass ratio of 1:1) during preparation of the positive electrode plate, the component mass ratio of the lithium cobalt oxide (LCO), the conductive agent, and the binder was 98.00:0.9:1.00, the thickness THK of the positive electrode plate was 92 μm, the quantity n of layers of the graphene was 12, and the one-side coating weight CW was 274 mg/1540.25 mm$^2$.

In this example, $Dv50^{1/2}+0.05$ THK was 8.57, and $w*CW+0.01n$ was 0.39.

EXAMPLE 15

Example 15 is the same as Example 1 except that Dv50 of the positive electrode active material was 14.9 μm, the conductive agent was replaced by carbon black+acetylene black (in a mass ratio of 2:1) during preparation of the positive electrode plate, the component mass ratio of the lithium cobalt oxide (LCO), the conductive agent, and the binder was 97.80:0.9:1.00, the thickness THK of the positive electrode plate was 110 μm, the mass percentage w of the graphene in the positive electrode active material layer was 0.3%, the one-side coating weight CW was 333 mg/1540.25 mm$^2$, and the quantity n of layers of the graphene was 12.

In this example, $Dv50^{1/2}+0.05$ THK was 9.36, and $w*CW+0.01n$ was 1.12.

EXAMPLE 16

Example 16 is the same as Example 1 except that Dv50 of the positive electrode active material was 14.2 μm, the component mass ratio of the lithium cobalt oxide (LCO), the conductive agent, and the binder was 97.80:0.9:1.00 during preparation of the positive electrode plate, the thickness THK of the positive electrode plate was 113 μm, the mass percentage w of the graphene in the positive electrode active material layer was 0.3%, the one-side coating weight CW was 343 mg/1540.25 mm$^2$, and the quantity n of layers of the graphene was 12.

In this example, $Dv50^{1/2}+0.05$ THK was 9.42, and $w*CW+0.01n$ was 1.15.

EXAMPLE 17

Example 17 is the same as Example 1 except that Dv50 of the positive electrode active material was 14 μm, the conductive agent was replaced by acetylene black+carbon nanotube (in a mass ratio of 1:3) during preparation of the positive electrode plate, the component mass ratio of the lithium cobalt oxide (LCO), the conductive agent, and the binder was 97.90:0.9:1.00, the thickness THK of the positive electrode plate was 85 μm, the mass percentage w of the graphene in the positive electrode active material layer was 0.2%, the one-side coating weight CW was 248 mg/1540.25 mm$^2$, and the quantity n of layers of the graphene was 12.

In this example, $Dv50^{1/2}+0.05$ THK was 7.99, and $w*CW+0.01n$ was 0.62.

EXAMPLE 18

Example 18 is the same as Example 1 except that Dv50 of the positive electrode active material was 14.8 μm, the conductive agent was replaced by carbon black+Ketjen black+carbon nanotube (in a mass ratio of 1:1:1) during preparation of the positive electrode plate, the component mass ratio of the lithium cobalt oxide (LCO), the conductive agent, and the binder was 97.80:0.9:1.00, the thickness THK of the positive electrode plate was 102 µm, the mass percentage w of the graphene in the positive electrode active material layer was 0.3%, the one-side coating weight CW was 307 mg/1540.25 mm², and the quantity n of layers of the graphene was 12.

In this example, $Dv50^{1/2}+0.05$ THK was 8.95, and w*CW+0.01n was 1.04.

EXAMPLE 19

Example 19 is the same as Example 1 except that Dv50 of the positive electrode active material was 15.3 µm, the binder was replaced by PVDF-PTFE during preparation of the positive electrode plate, the component mass ratio of the lithium cobalt oxide (LCO), the conductive agent, and the binder was 97.40:1.1:1.30, the thickness THK of the positive electrode plate was 97 µm, the mass percentage w of the graphene in the positive electrode active material layer was 0.2%, the one-side coating weight CW was 290 mg/1540.25 mm², and the quantity n of layers of the graphene was 12.

In this example, $Dv50^{1/2}+0.05$ THK was 8.76, and w*CW+0.01n was 0.70.

EXAMPLE 20

Example 20 is the same as Example 1 except that Dv50 of the positive electrode active material was 15.6 µm, the binder was replaced by PVDF-PTFE during preparation of the positive electrode plate, the component mass ratio of the lithium cobalt oxide (LCO), the conductive agent, and the binder was 97.30:1.1:1.30, the thickness THK of the positive electrode plate was 88 µm, the mass percentage w of the graphene in the positive electrode active material layer was 0.3%, the one-side coating weight CW was 256 mg/1540.25 mm², and the quantity n of layers of the graphene was 7.

In this example, $Dv50^{1/2}+0.05$ THK was 8.35, and w*CW+0.01n was 0.84.

EXAMPLE 21

Example 21 is the same as Example 1 except that Dv50 of the positive electrode active material was 14.7 µm, the binder was replaced by PVDF-PTFE during preparation of the positive electrode plate, the component mass ratio of the lithium cobalt oxide (LCO), the conductive agent, and the binder was 97.50:1.1:1.30, the thickness THK of the positive electrode plate was 103 µm, the mass percentage w of the graphene in the positive electrode active material layer was 0.1%, the one-side coating weight CW was 310 mg/1540.25 mm², and the quantity n of layers of the graphene was 15.

In this example, $Dv50^{1/2}+0.05$ THK was 8.98, and w*CW+0.01n was 0.46.

EXAMPLE 22

Example 22 is the same as Example 1 except that Dv50 of the positive electrode active material was 15.1 µm, the binder was replaced by PVDF-PTFE during preparation of the positive electrode plate, the component mass ratio of the lithium cobalt oxide (LCO), the conductive agent, and the binder was 97.40:1.1:1.30, the thickness THK of the positive electrode plate was 78 µm, the mass percentage w of the graphene in the positive electrode active material layer was 0.2%, the one-side coating weight CW was 225 mg/1540.25 mm², and the quantity n of layers of the graphene was 9.

In this example, $Dv50^{1/2}+0.05$ THK was 7.79, and w*CW+0.01n was 0.54.

EXAMPLE 23

Example 23 is the same as Example 1 except that Dv50 of the positive electrode active material was 13.8 µm, the binder was replaced by PVDF-PTFE during preparation of the positive electrode plate, the component mass ratio of the lithium cobalt oxide (LCO), the conductive agent, and the binder was 97.50:1.1:1.30, the thickness THK of the positive electrode plate was 98 µm, the mass percentage w of the graphene in the positive electrode active material layer was 0.1%, the one-side coating weight CW was 293 mg/1540.25 mm², and the quantity n of layers of the graphene was 9.

In this example, $Dv50^{1/2}+0.05$ THK was 8.61, and w*CW+0.01n was 0.38.

COMPARATIVE EXAMPLE 1

Comparative Example 1 is the same as Example 1 except that Dv50 of the positive electrode active material was 13.2 µm, the thickness THK of the positive electrode plate was 70 µm, the one-side coating weight CW was 195 mg/1540.25 mm², and the quantity n of layers of the graphene was 3.

$Dv50^{1/2}+0.05$ THK was 7.13, and w*CW+0.01n was 0.22.

COMPARATIVE EXAMPLE 2

Comparative Example 2 is the same as Example 1 except that Dv50 of the positive electrode active material was 18 µm, the thickness THK of the positive electrode plate was 125 µm, the mass percentage w of the graphene in the positive electrode active material layer was 0.5%, the one-side coating weight CW was 378 mg/1540.25 mm², and the quantity n of layers of the graphene was 30.

$Dv50^{1/2}+0.05$ THK was 10.49, and w*CW+0.01n was 2.19.

COMPARATIVE EXAMPLE 3

Comparative Example 3 is the same as Example 1 except that Dv50 of the positive electrode active material was 14.7 µm, the thickness THK of the positive electrode plate was 130 µm, the mass percentage w of the graphene in the positive electrode active material layer was 1%, the one-side coating weight CW was 394 mg/1540.25 mm², and the quantity n of layers of the graphene was 12.

In this example, $Dv50^{1/2}+0.05$ THK was 10.33, and w*CW+0.01n was 4.06.

COMPARATIVE EXAMPLE 4

Comparative Example 4 is the same as Example 1 except that Dv50 of the positive electrode active material was 12 µm, the thickness THK of the positive electrode plate was 70 µm, the mass percentage w of the graphene in the positive electrode active material layer was 0.01%, the one-side coating weight CW was 188 mg/1540.25 mm², and the quantity n of layers of the graphene was 7.

$Dv50^{1/2}+0.05$ THK was 6.96, and w*CW+0.01n was 0.09.

COMPARATIVE EXAMPLE 5

Comparative Example 5 is the same as Example 1 except that Dv50 of the positive electrode active material was 20

μm, the thickness THK of the positive electrode plate was 50 μm, the one-side coating weight CW was 129 mg/1540.25 mm², and the quantity n of layers of the graphene was 7.

$Dv50^{1/2}+0.05$ THK was 6.97, and w*CW+0.01n was 0.20.

COMPARATIVE EXAMPLE 6

Comparative Example 6 is the same as Example 1 except that Dv50 of the positive electrode active material was 5 μm, the thickness THK of the positive electrode plate was 80 μm, the one-side coating weight CW was 205 mg/1540.25 mm², and the quantity n of layers of the graphene was 7.

$Dv50^{1/2}+0.05$ THK was 6.24, and w*CW+0.01n was 0.28.

COMPARATIVE EXAMPLE 7

Comparative Example 7 is the same as in Example 1 except that the graphene was replaced by artificial graphite KS-6.

COMPARATIVE EXAMPLE 8

Comparative Example 8 is the same as in Example 1 except that the graphene was replaced by flake graphite SFG-6.

Parameters and test results of Examples 1 to 23 and Comparative Examples 1 to 8 are shown in Table 1 and Table 2.

TABLE 1

| Example | Positive electrode active material Dv50 (μm) | Positive electrode active material | LCO (weight %) | Conductive agent (weight %) | Binder (weight %) | Type of conductive agent | Type of binder |
|---|---|---|---|---|---|---|---|
| Example 1 | 15.6 | Lithium cobalt oxide | 97.8 | 0.9 | 1.2 | Carbon black + carbon nanotube | PVDF |
| Example 2 | 15.6 | Lithium cobalt oxide | 97.8 | 0.9 | 1.2 | Carbon black + carbon nanotube | PVDF-HFP |
| Example 3 | 15.6 | Lithium cobalt oxide | 97.8 | 0.9 | 1.2 | Carbon black + carbon nanotube | PVDF-PTFE |
| Example 4 | 15.6 | Lithium cobalt oxide | 97.8 | 0.9 | 1.2 | Carbon black + carbon nanotube | PVDF |
| Example 5 | 15.6 | Lithium cobalt oxide | 98 | 0.9 | 1 | Carbon nanotube | PVDF |
| Example 6 | 15.6 | Lithium cobalt oxide | 97.5 | 1.1 | 1.3 | Carbon black + carbon nanotube | PVDF |
| Example 7 | 15 | Lithium cobalt oxide | 97.4 | 1.3 | 1.1 | Carbon nanotube | PVDF |
| Example 8 | 15 | Lithium cobalt oxide | 97.3 | 1.3 | 1.1 | Carbon black + carbon nanotube | PVDF |
| Example 9 | 15 | Lithium cobalt oxide | 97.2 | 1.3 | 1.1 | Carbon black + carbon nanotube | PVDF |
| Example 10 | 15 | Lithium cobalt oxide | 97.1 | 1.3 | 1.1 | Carbon black + carbon nanotube | PVDF |
| Example 11 | 14.5 | Lithium cobalt oxide | 97.5 | 1.3 | 1.1 | Ketjen black + carbon nanotube | PVDF |
| Example 12 | 16.3 | Lithium cobalt oxide | 97.3 | 1.3 | 1.1 | Carbon black + Ketjen black + carbon nanotube | PVDF |
| Example 13 | 16.2 | Lithium cobalt oxide | 97.4 | 1.3 | 1.1 | Carbon black + acetylene black + carbon nanotube | PVDF |
| Example 14 | 15.8 | Lithium cobalt oxide | 98 | 0.9 | 1 | Acetylene black + carbon nanotube | PVDF |
| Example 15 | 14.9 | Lithium cobalt oxide | 97.8 | 0.9 | 1 | Carbon black + acetylene black | PVDF |
| Example 16 | 14.2 | Lithium cobalt oxide | 97.8 | 0.9 | 1 | Carbon black + carbon nanotube | PVDF |
| Example 17 | 14 | Lithium cobalt oxide | 97.9 | 0.9 | 1 | Acetylene black + carbon nanotube | PVDF |

TABLE 1-continued

| | | | | | | | |
|---|---|---|---|---|---|---|---|
| Example 18 | 14.8 | Lithium cobalt oxide | 97.8 | 0.9 | 1 | Carbon black + Ketjen black + carbon nanotube | PVDF |
| Example 19 | 15.3 | Lithium cobalt oxide | 97.4 | 1.1 | 1.3 | Carbon black + carbon nanotube | PVDF-PTFE |
| Example 20 | 15.6 | Lithium cobalt oxide | 97.3 | 1.1 | 1.3 | Carbon black + carbon nanotube | PVDF-PTFE |
| Example 21 | 14.7 | Lithium cobalt oxide | 97.5 | 1.1 | 1.3 | Carbon black + carbon nanotube | PVDF-PTFE |
| Example 22 | 15.1 | Lithium cobalt oxide | 97.4 | 1.1 | 1.3 | Carbon black + carbon nanotube | PVDF-PTFE |
| Example 23 | 13.8 | Lithium cobalt oxide | 97.5 | 1.1 | 1.3 | Carbon black + carbon nanotube | PVDF-PTFE |
| Comparative Example 1 | 13.2 | Lithium cobalt oxide | 97.5 | 1.1 | 1.3 | Carbon black + carbon nanotube | PVDF |
| Comparative Example 2 | 18 | Lithium cobalt oxide | 97.1 | 1.1 | 1.3 | Carbon black + carbon nanotube | PVDF |
| Comparative Example 3 | 14.7 | Lithium cobalt oxide | 96.6 | 1.1 | 1.3 | Carbon black + carbon nanotube | PVDF-PTFE |
| Comparative Example 4 | 12 | Lithium cobalt oxide | 97.59 | 1.1 | 1.3 | Carbon black + carbon nanotube | PVDF |
| Comparative Example 5 | 20 | Lithium cobalt oxide | 97.5 | 1.1 | 1.3 | Carbon black + carbon nanotube | PVDF |
| Comparative Example 6 | 5 | Lithium cobalt oxide | 97.5 | 1.1 | 1.3 | Carbon black + carbon nanotube | PVDF-HFP |
| Comparative Example 7 | 15.6 | Lithium cobalt oxide | 97.5 | 1.1 | 1.3 | Carbon black + carbon nanotube | PVDF |
| Comparative Example 8 | 15.6 | Lithium cobalt oxide | 97.5 | 1.1 | 1.3 | Carbon black + carbon nanotube | PVDF |

| | | Positive electrode plate | | | | | |
|---|---|---|---|---|---|---|---|
| Example | Type of additive | THK of the electrode plate | Mass percentage w of additive | CW (mg/1540.25 mm$^2$) | Quantity n of layers of graphene | $Dv50^{1/2}$ + 0.05THK | w*CW + 0.01n |
| Example 1 | graphene | 100 | 0.001 | 303 | 10 | 8.95 | 0.4 |
| Example 2 | graphene | 80 | 0.001 | 234 | 10 | 7.95 | 0.33 |
| Example 3 | graphene | 85 | 0.001 | 251 | 10 | 8.2 | 0.35 |
| Example 4 | graphene | 90 | 0.001 | 267 | 10 | 8.45 | 0.37 |
| Example 5 | graphene | 110 | 0.001 | 329 | 10 | 9.45 | 0.43 |
| Example 6 | graphene | 105 | 0.001 | 313 | 10 | 9.2 | 0.41 |
| Example 7 | graphene | 100 | 0.002 | 300 | 10 | 8.87 | 0.7 |
| Example 8 | graphene | 100 | 0.003 | 300 | 10 | 8.87 | 1 |
| Example 9 | graphene | 100 | 0.004 | 300 | 10 | 8.87 | 1.3 |
| Example 10 | graphene | 100 | 0.005 | 300 | 10 | 8.87 | 1.6 |
| Example 11 | graphene | 90 | 0.001 | 267 | 12 | 8.31 | 0.39 |
| Example 12 | graphene | 85 | 0.003 | 251 | 12 | 8.29 | 0.87 |
| Example 13 | graphene | 88 | 0.002 | 260 | 12 | 8.42 | 0.64 |
| Example 14 | graphene | 92 | 0.001 | 274 | 12 | 8.57 | 0.39 |
| Example 15 | graphene | 110 | 0.003 | 333 | 12 | 9.36 | 1.12 |
| Example 16 | graphene | 113 | 0.003 | 343 | 12 | 9.42 | 1.15 |
| Example 17 | graphene | 85 | 0.002 | 248 | 12 | 7.99 | 0.62 |
| Example 18 | graphene | 102 | 0.003 | 307 | 12 | 8.95 | 1.04 |
| Example 19 | graphene | 97 | 0.002 | 290 | 12 | 8.76 | 0.7 |
| Example 20 | graphene | 88 | 0.003 | 256 | 7 | 8.35 | 0.84 |
| Example 21 | graphene | 103 | 0.001 | 310 | 15 | 8.98 | 0.46 |
| Example 22 | graphene | 78 | 0.002 | 225 | 9 | 7.79 | 0.54 |
| Example 23 | graphene | 98 | 0.001 | 293 | 9 | 8.61 | 0.38 |
| Comparative Example 1 | graphene | 70 | 0.001 | 195 | 3 | 7.13 | 0.22 |
| Comparative Example 2 | graphene | 125 | 0.005 | 378 | 30 | 10.49 | 2.19 |
| Comparative Example 3 | graphene | 130 | 0.01 | 394 | 12 | 10.33 | 4.06 |

TABLE 1-continued

| | | | | | | | |
|---|---|---|---|---|---|---|---|
| Comparative Example 4 | graphene | 70 | 0.0001 | 188 | 7 | 6.96 | 0.09 |
| Comparative Example 5 | graphene | 50 | 0.001 | 129 | 7 | 6.97 | 0.2 |
| Comparative Example 6 | graphene | 80 | 0.001 | 205 | 7 | 6.24 | 0.28 |
| Comparative Example 7 | KS-6 | 100 | 0.001 | 303 | — | 8.95 | — |
| Comparative Example 8 | SFG-6 | 100 | 0.001 | 303 | — | 8.95 | — |

TABLE 2

| | Compacted density after cold pressing | Quantity of cycles at 25° C. | Quantity of cycles at 45° C. |
|---|---|---|---|
| Example 1 | 4.33 | 898 | 623 |
| Example 2 | 4.28 | 886 | 615 |
| Example 3 | 4.28 | 920 | 630 |
| Example 4 | 4.28 | 880 | 620 |
| Example 5 | 4.23 | 865 | 630 |
| Example 6 | 4.23 | 868 | 629 |
| Example 7 | 4.28 | 861 | 631 |
| Example 8 | 4.28 | 854 | 633 |
| Example 9 | 4.28 | 647 | 535 |
| Example 10 | 4.28 | 589 | 510 |
| Example 11 | 4.28 | 823 | 620 |
| Example 12 | 4.28 | 769 | 667 |
| Example 13 | 4.28 | 888 | 689 |
| Example 14 | 4.28 | 798 | 702 |
| Example 15 | 4.28 | 809 | 688 |
| Example 16 | 4.28 | 900 | 698 |
| Example 17 | 4.23 | 796 | 648 |
| Example 18 | 4.28 | 803 | 702 |
| Example 19 | 4.28 | 876 | 675 |
| Example 20 | 4.2 | 792 | 642 |
| Example 21 | 4.28 | 620 | 579 |
| Example 22 | 4.23 | 826 | 652 |
| Example 23 | 4.28 | 790 | 632 |
| Comparative Example 1 | 4.15 | 783 | 685 |
| Comparative Example 2 | 4.23 | 382 | 253 |
| Comparative Example 3 | 4.23 | 432 | 358 |
| Comparative Example 4 | 4 | 487 | 362 |
| Comparative Example 5 | 4.1 | 578 | 463 |
| Comparative Example 6 | 3.75 | 460 | 358 |
| Comparative Example 7 | 4.23 | 380 | 200 |
| Comparative Example 8 | 4.23 | 410 | 220 |

As can be seen from Table 1 and Table 2, the batteries in Examples 1 to 23 featured high compacted density and long cycle life because better particle accumulation was implemented to achieve high compacted density due to the particle size distribution of the positive electrode active material and addition of the graphene. In addition, addition of the graphene optimized pore distribution of the electrode, lithium ions were able to smoothly move from the positive electrode active material to the negative electrode. In this way, the compacted density of the electrode plate was improved and good performance of the battery cell was maintained.

Examples 1 to 6 showed the test results obtained when the particle size Dv50 of the positive electrode active material was 15.6 μm, and when the thickness THK of the positive electrode plate was adjusted to satisfy $Dv50^{1/2}+0.05THK$ ranging from 7.74 to 10.2, the battery could have both high compacted density and high cycle performance.

Not based on any theory, the inventor considered that when the particle size Dv50 of the positive electrode active material was relatively small or the thickness THK of the positive electrode plate was relatively small, resulting in a lower limit value of $Dv50^{1/2}+0.05THK$ being less than 7.74, the compacted density of the electrode plate was very poor and the energy density of the battery cell was relatively low. When the particle size Dv50 of the positive electrode active material was relatively large or the thickness THK of the positive electrode plate was relatively large, resulting in an upper limit value of $Dv50^{1/2}+0.05THK$ being greater than 10.2, accumulation of the positive electrode active particles was also very poor, and the solid-phase diffusion and liquid-phase diffusion of lithium ions became main bottlenecks for performance of the battery cell, leading to poor cycle performance of the battery cell.

A preferred range of the particle size Dv50 of the positive electrode active material is 14 μm to 16 μm, and a preferred range of the thickness THK of the positive electrode plate is 80 μm to 110 μm. It should be noted by the inventor that, when one or both of the average particle size Dv50 of the positive electrode active material and the thickness THK of the positive electrode plate do not fall within the foregoing preferred ranges, and $Dv50^{1/2}+0.05THK$ is between 7.74 to 10.2, the resulting battery can still have both high compacted density and high cycle performance. For example, in Examples 22 and 23, neither the average particle size Dv50 of the positive electrode active material nor the thickness THK of the positive electrode plate falls within the foregoing preferred ranges; however, the matching relationship between the graphene addition amount, the quantity of layers of the graphene, and the thickness THK of the positive electrode plate was properly controlled, so that $Dv50^{1/2}+0.05THK$ falls between 7.74 to 10.2, thereby implementing high compacted density and high performance.

Not based on any theory, the inventor considered that when the graphene content of the positive electrode active material layer, the coating weight, and the quantity of layers of the graphene did not match, resulting in the upper limit of w*CW+0.01n being greater than 1.84, an excessively large coating weight caused a long transmission path of lithium ions in the electrode plate. In addition, the high graphene content imposed a blocking effect on conduction of the lithium ions in the z direction to some extent, and consequently obstruction for internal liquid phase conduction of the lithium ions was relatively large, resulting in further deterioration of the performance of the battery cell. When the graphene content of the positive electrode active material layer, the coating weight, and the quantity of layers of the graphene did not match, resulting in the lower limit of w*CW+0.01n being less than 0.078, the particles could not be effectively lubricated due to an excessively small coating weight and an excessively small graphene content, the problem of brittleness easily occurred when the compacted density was high, and winding could not be performed. Compared with Examples 1 to 23, the compacted density of the electrode plates prepared in Comparative Examples 1 and 4 to 6 was obviously reduced while the cycle performance was significantly decreased in Comparative Examples 2, 3, 7, and 8 although the compacted density was higher after cold pressing.

Although this application has been described above in detail with general description, specific embodiments, and examples, some modifications or improvements may be made on the basis of this application, which is obvious to those skilled in the art. Therefore, these modifications or improvements made without departing from the spirit of this application shall fall within the protection scope of this application.

What is claimed is:

1. A positive electrode plate, comprising: a positive electrode current collector and two positive electrode active material layers on both surfaces of the positive electrode current collector, the positive electrode active material layer comprises a positive electrode active material and graphene, and
    $7.74 \leq Dv50^{1/2} + 0.05 THK \leq 10.2$, wherein Dv50 is a particle size of the positive electrode active material and THK is a thickness of the positive electrode plate,
    Dv50 is measured in μm, and THK is measured in μm; and $0.078 \leq w*CW + 0.01n \leq 1.9$,
wherein, n is a quantity of layers of the graphene, w is a mass percentage of the graphene in the positive electrode active material layer, and CW is a one-side coating weight of the positive electrode active material layer; and CW is measured in mg/1540.25 mm².

2. The positive electrode plate according to claim 1, wherein the positive electrode plate after cold pressing has a compacted density of 4.1 g/mm³ to 4.35 g/mm³.

3. The positive electrode plate according to claim 1, wherein the positive electrode active material comprises at least one selected from the group consisting of lithium cobalt oxide, lithium nickel cobalt manganate, lithium nickel cobalt aluminate, lithium manganate oxide, lithium manganese iron phosphate, lithium vanadium phosphate, lithium vanadyl phosphate, lithium iron phosphate, lithium titanate, and lithium-manganese-containing-based material.

4. The positive electrode plate according to claim 1, wherein the particle size Dv50 of the positive electrode active material is 13 μm to 18 μm.

5. The positive electrode plate according to claim 1, wherein the thickness THK of the positive electrode plate is 80 μm to 115 μm.

6. The positive electrode plate according to claim 1, the positive electrode plate has at least one of the following characteristics:
    w is 0.01% to 0.5%;
    n is 6 to 20; and
    CW 180 mg/1540.25 mm² to 350 mg/1540.25 mm².

7. The positive electrode plate according to claim 6, the positive electrode plate has at least one of the following characteristics:
    w is 0.05% to 0.3%;
    n is 8 to 14; and
    CW is 220 mg/1540.25 mm² to 350 mg/1540.25 mm².

8. The positive electrode plate according to claim 1, wherein the positive electrode active material layer further comprises a conductive agent, and the conductive agent comprises at least one selected from the group consisting of carbon black, Ketjen black, acetylene black, and carbon nanotube.

9. The positive electrode plate according to claim 1, wherein the positive electrode active material layer further comprises a binder, and the binder comprises at least one selected from the group consisting of polyvinylidene fluoride, vinylidene fluoride-hexafluoropropylene copolymer, vinylidene fluoride-tetrafluoroethylene copolymer, and polytetrafluoroethylene.

10. An electrochemical apparatus, comprising a positive electrode plate, the positive electrode plate comprises a positive electrode current collector and two positive electrode active material layers on both surfaces of the positive electrode current collector, the positive electrode active material layer comprises a positive electrode active material and graphene, and
    $7.74 \leq Dv501/2 + 0.05 THK \leq 10.2$, wherein Dv50 is a particle size of the positive electrode active material and THK is a thickness of the positive electrode plate,
    Dv50 is measured in μm, and THK is measured in μm; and $0.078 \leq w*CW + 0.01n \leq 1.9$,
    wherein n is a quantity of layers of the graphene, w is a mass percentage of the graphene in the positive electrode active material layer, and CW is a one-side coating weight of the positive electrode active material layer; and CW is measured in mg/1540.25 mm².

11. The electrochemical apparatus according to claim 10, wherein the positive electrode plate after cold pressing has a compacted density of 4.1 g/mm³ to 4.35 g/mm³.

12. The electrochemical apparatus according to claim 10, wherein the positive electrode active material comprises at least one selected from the group consisting of lithium cobalt oxide, lithium nickel cobalt manganate, lithium nickel cobalt aluminate, lithium manganate oxide, lithium manganese iron phosphate, lithium vanadium phosphate, lithium vanadyl phosphate, lithium iron phosphate, lithium titanate, and lithium-manganese-containing-based material.

13. The electrochemical apparatus according to claim 10, wherein the particle size Dv50 of the positive electrode active material is 13 μm to 18 μm.

14. The electrochemical apparatus according to claim 10, wherein the thickness THK of the positive electrode plate is 80 μm to 115 μm.

15. The electrochemical apparatus according to claim 10, the positive electrode plate has at least one of the following characteristics:
    w is 0.01% to 0.5%;
    n is 6 to 20; and
    CW is 180 mg/1540.25 mm² to 350 mg/1540.25 mm².

16. The electrochemical apparatus according to claim 15, the positive electrode plate has at least one of the following characteristics:
    w is 0.05% to 0.3%;
    n is 8 to 14 layers; and
    CW is 220 mg/1540.25 mm² to 350 mg/1540.25 mm².

17. The electrochemical apparatus according to claim 10, wherein the positive electrode active material layer further comprises a conductive agent, and the conductive agent comprises at least one selected from the group consisting of carbon black, Ketjen black, acetylene black, and carbon nanotube.

18. The electrochemical apparatus according to claim 10, wherein the positive electrode active material layer further comprises a binder, and the binder comprises at least one selected from the group consisting of polyvinylidene fluoride, vinylidene fluoride-hexafluoropropylene copolymer, vinylidene fluoride-tetrafluoroethylene copolymer, and polytetrafluoroethylene.

19. An electronic apparatus, comprising an electrochemical apparatus, the electrochemical apparatus comprises a positive electrode plate, the positive electrode plate comprises a positive electrode current collector and two positive electrode active material layers on both surfaces of the positive electrode current collector, the positive electrode active material layer comprises a positive electrode active material and graphene, and $7.74 \leq Dv50^{1/2} + 0.05 THK \leq 10.2$, wherein Dv50 is a particle size of the positive electrode active material and THK is a thickness of the positive electrode plate, Dv50 is measured in μm, and THK is measured in μm; and $0.078 \leq w*CW + 0.01n \leq 1.9$, wherein n is a quantity of layers of the graphene, w is a mass percentage of the graphene in the positive electrode active material layer, and CW is a one-side coating weight of the positive electrode active material layer; and CW is measured in $mg/1540.25\ mm^2$.

* * * * *